US011955746B2

(12) United States Patent
Mastel

(10) Patent No.: US 11,955,746 B2
(45) Date of Patent: Apr. 9, 2024

(54) PROTECTIVE COVER ELEMENT AND ELECTRICAL PLUG-AND-SOCKET CONNECTOR

(71) Applicant: WAGO Verwaltungsgesellschaft mbH, Minden (DE)

(72) Inventor: Rudolf Mastel, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 17/713,295

(22) Filed: Apr. 5, 2022

(65) Prior Publication Data

US 2022/0328996 A1 Oct. 13, 2022

(30) Foreign Application Priority Data

Apr. 7, 2021 (DE) ..................... 10 2021 108 628.0

(51) Int. Cl.

*H01R 13/44* (2006.01)
*H01R 13/04* (2006.01)
*H01R 13/41* (2006.01)

(52) U.S. Cl.

CPC ............. *H01R 13/44* (2013.01); *H01R 13/04* (2013.01); *H01R 13/41* (2013.01)

(58) Field of Classification Search

CPC ......... H01R 13/44; H01R 13/04; H01R 13/41
See application file for complete search history.

(56) References Cited

U.S. PATENT DOCUMENTS

2021/0075139 A1* 3/2021 Kitaoka ................. H01R 13/18
2021/0257768 A1 8/2021 Shimizu et al.
2021/0336390 A1* 10/2021 Shimizu ............... H01R 13/502
2022/0013945 A1* 1/2022 Kobayashi ............. H01R 13/42
2022/0328996 A1* 10/2022 Mastel .................... H01R 13/44
2022/0337005 A1* 10/2022 Pamart ............... H01R 13/2407
2023/0040389 A1* 2/2023 Yamada ............... H01R 13/447

FOREIGN PATENT DOCUMENTS

DE 102012105839 A1 2/2014
DE 102015107304 * 11/2016 ............. H01R 13/04
DE 102015107304 A1 11/2016
JP 2014179290 A 9/2014
WO WO2020003566 A1 1/2020

* cited by examiner

*Primary Examiner* — Truc T Nguyen
(74) *Attorney, Agent, or Firm* — Muncy, Geissler, Olds & Lowe, P.C.

(57) ABSTRACT

A protective cover element for mounting on a contact blade of a blade contact of an electrical plug-and-socket connector projecting out of an insulating material, as well as to an electrical plug-and-socket connector with at least one such protective cover element.

13 Claims, 7 Drawing Sheets

PROTECTIVE COVER ELEMENT AND ELECTRICAL PLUG-AND-SOCKET CONNECTOR

This nonprovisional application claims priority under 35 U.S.C. § 119(a) to German Patent Application No. 10 2021 108 628.0, which was filed in Germany on Apr. 7, 2021, and which is herein incorporated by reference.

BACKGROUND OF THE INVENTION

Field of the Invention

The present invention relates to a protective cover element for mounting on a contact blade of a blade contact of an electrical plug-and-socket connector projecting out of an insulating material of a connector housing, as well as to an electrical plug-and-socket connector with at least one such protective cover element.

Description of the Background Art

In electrical plug-and-socket connection arrangements, finger touch protection must be ensured in order to protect against accidents. To test the finger touch protection, a standardized test finger is pushed with a defined force against or into an opening of a housing component of an electrical plug-and-socket connector, and it is verified that no current-carrying component comes into contact with the test finger.

A proposal is evident from DE 10 2012 105 839 A1, to design a connector housing with stirrup-shaped bearing elements that at least partially cover a relevant blade contact of an electrical plug-and-socket connector on the front. Touch protection is intended to be ensured in this way, even in the unmated state of the plug-and-socket connection device.

SUMMARY OF THE INVENTION

It is therefore an object of the present invention to ensure the required finger touch protection in a simple and universally applicable fashion in an electrical plug-and-socket connector that has one or more contact blades projecting out of an insulating material of the housing of the plug-and-socket connector.

This object is attained in an exemplary embodiment by a protective cover element for mounting on a contact blade of a blade contact of an electrical plug-and-socket connector, a length of which contact blade projects out of an insulating material of a connector housing of the plug-and-socket connector, wherein the protective cover element has an insertion side with which it can be pushed over the contact blade from the front of the contact blade, wherein the protective cover element has at least one insulating protective element on the front that at least partially covers the front of the contact blade in the plug-in direction of a bifurcated contact designed as a mating part for the blade contact when the protective cover element is mounted on the contact blade, wherein the protective cover element has multiple longitudinal ribs extending from the protective element on the front in the direction toward the insertion side, wherein all longitudinal ribs are shorter than 75% of the length with which the contact blade projects out of the insulating material. The protective cover element according to the invention is thus designed to be relatively compact in the plugging direction in which a mating connector can be plugged onto the plug-and-socket connector, and therefore covers essentially only the region on the front of the contact blade. By this means, the protective cover element can be provided in a material-saving fashion, and it nevertheless satisfies the desired requirements for finger touch protection. For example, the protective cover element can also be designed such that all longitudinal ribs are shorter than 65% of the length with which the contact blade projects out of the insulating material. As a result, the protective cover element is spaced relatively far away from the location where the contact blade projects out of the insulating material.

In this context, the front of the contact blade is the side on which the bifurcated contact designed as a mating part is mounted on the contact blade in the plugging direction. The protective cover element can be designed as a separate component that can be fastened to the contact blade by interlocking, frictional, and/or integral means. With the protective cover element according to the invention, any desired plug-and-socket connectors with projecting contact blades can be equipped with the protective cover element, even as a later modification, thereby satisfying the required finger touch protection. The protective cover element according to the invention is thus also suitable for retrofit purposes.

The protective cover element can be installed quickly and easily on the contact blade by simply being pushed on, and is held on the contact blade on account of the interlocking connection and/or frictional connection. Alternatively or in addition, the fastening can be accomplished by an integral connection between the contact blade and the protective cover element, for example by adhesive bonding.

Advantageously, the protective cover element has multiple longitudinal ribs extending from the protective element on the front in the direction toward the insertion side. In this way, the protective cover element can be made mechanically robust so that, in particular, it can absorb the forces that arise when it is being pushed onto the contact blade without being damaged. The longitudinal ribs can, for example, extend exactly in, or else at a certain angle to, the plug-in direction of the plug-and-socket connector designed as a mating part, which has one or more bifurcated contacts. Between the longitudinal ribs, free spaces can be formed that, when the protective cover element is mounted on the contact blade, expose opposing contact areas of the contact blade located on respective opposing contact sides, so that a bifurcated contact with mirror-symmetrically arranged contact forks can be electrically connected to the contact areas of the contact blade exposed by the free spaces when the protective cover element is mounted on the contact blade. If the contact blade is viewed from its front with the contact blade oriented vertically, the contact areas are therefore located on the left and right sides of the contact blade, wherein they advantageously are each located at the same level. This makes it possible that a bifurcated contact whose contact forks are arranged in pairs that are each mirror symmetric about the vertical axis, in each case with respect to the above-defined direction of view of the contact blade, can be electrically connected to the blade contact despite the protective cover element mounted on the contact blade. Such a symmetrical bifurcated contact permits reliable establishment of electrical contact with the contact blade at the same time as convenient handling when the plug-and-socket connection is plugged together or separated.

Provision can be made that the longitudinal ribs have different lengths. By this means, the longitudinal ribs can each be optimized for their different functions, such as for a strictly covering function of the contact blade and/or a fastening function for fastening the protective cover element onto the contact blade.

Provision can be made that a fastening element, with which the protective cover element can be fastened to a securing element—associated therewith as a mating part—of the contact blade, is arranged on at least one of the longitudinal ribs. In this way, the protective cover element can be attached to the plug-and-socket connector easily and quickly, even as a later modification. The protective cover element can, for example, be connected in an interlocking manner to the securing element of the contact blade, for example be latched thereto.

Provision can be made that the protective cover element has, as longitudinal rib, at least one intermediate rib that extends—in the region between the opposing lateral edges of the contact blade—from the protective element on the front in the direction toward the insertion side. The mechanical stability of the protective cover element is increased further by this means. Moreover, the protection against accidental contact can be improved further by one or more such intermediate ribs, especially in the case of large contact blades.

The protective cover element can have intermediate ribs in pairs, in each case on opposing contact sides of the contact blade. The paired intermediate ribs can be arranged such that, when the protective cover element is mounted on the contact blade, they expose contact areas (contact windows) of the contact blade arranged opposite one another on the respective opposing contact sides of the contact blade, so that a bifurcated contact with mirror-symmetrically arranged contact forks can be electrically connected thereto when the protective cover element is mounted on the contact blade.

As a result of such intermediate ribs, the respective contact side of the contact blade that is covered thereby is divided into additional contact areas in the sense of contact windows. It is advantageous, for example, to create, by means of the longitudinal ribs, as many contact windows for each contact side of the contact blade as there are contact fork pairs on the bifurcated contact. If the bifurcated contact is designed with two contact forks per contact side, it is advantageous to arrange an intermediate rib centered between a top and bottom narrow-side cover of the protective cover element.

Provision can be made that the paired opposing intermediate ribs are connected to one another by a connecting rib. In this way, the protective cover element is mechanically stabilized in the region of the intermediate ribs. Moreover, a robust fastening capability for fastening the protective cover element to the contact blade is provided in this way.

As a result, a fastening element for fastening the protective cover element to the contact blade can be arranged on the connecting rib. Moreover, at least one intermediate rib can constitute the longest longitudinal rib.

A top narrow-side cover and/or a bottom narrow-side cover, extending from the protective element on the front in the direction toward the insertion side, may be present as a longitudinal rib of the protective cover element and covers at least areas of a respective lateral edge of the contact blade when the protective cover element is mounted on the contact blade. By this means, the degree of coverage of the contact blade by the protective cover element is increased further, so that further improved touch protection can be achieved, particularly when the top and/or bottom narrow-side cover is/are made of insulating material. Moreover, the stability of the protective cover element is increased further.

The top and/or the bottom narrow-side cover can have a greater width than the insertion opening. In particular, the top and/or the bottom narrow-side cover can be wider than the thickness of the contact blade. For example, the top and/or the bottom narrow-side cover can have a U-shaped cross-sectional profile, so that a U-shaped wrapping of the respective lateral edge of the contact blade is possible. Further improved touch protection can be achieved by this means. Moreover, the stability of the protective cover element is increased further.

Provision can be made that the protective cover element may be designed to be open on the insertion side with no connection between narrow-side covers. By this means, the protective cover element can likewise be provided in a very material-saving fashion.

The protective cover element can have, as a protective element on the front, a front rib having such a length that it extends across essentially the entire length of the front of the contact blade when the protective cover element is mounted on the contact blade. This has the advantage that the contact blade can be made touch-safe on the front over its entire longitudinal extent by means of the one protective cover element. Moreover, the front rib that is designed to be relatively long also contributes to the mechanical stability of the protective cover element.

Provision can be made that the protective element on the front has a lesser thickness than the thickness of the contact blade. This is useful for easy mounting of a mating part for the contact blade designed as a bifurcated contact. The protective element on the front is thus narrower than the contact blade, so that the contact forks of a bifurcated contact to be mounted on the contact blade can be brought into direct electrical and mechanical contact with the blade contact without first having to be deflected over the protective element on the front. As a result, a bifurcated contact can be plugged onto the contact blade as usual, without the protective cover element arranged on the contact blade making any difference with regard to the feel or the operation when plugging together and separating the plug-and-socket connection.

The protective cover element can be designed to be beveled on the front. This additionally facilitates mounting of a mating part for the blade contact, which is to say a bifurcated contact. The contact forks of the bifurcated contact are additionally guided by the beveled region of the protective cover element. The protective cover element can be designed to be beveled relative to the vertical axis and/or relative to the transverse axis. The vertical axis is understood here to be the vertical direction when the protective cover element is oriented to correspond to a contact blade that is oriented with its front vertically. A horizontal line that is perpendicular to the insertion direction is then understood as the transverse axis.

The above-mentioned object is also attained by an electrical plug-and-socket connector with a connector housing made of insulating material and with at least one blade contact that has, projecting out of the insulating material, a contact blade, a length of which projects out of the insulating material of the plug-and-socket connector, wherein a protective cover element of the above-described type is mounted on the contact blade and is fastened to the contact blade by interlocking, frictional, and/or integrally. The protective cover element can, in particular, be designed in accordance with one of the advantageous embodiments explained above. The advantages explained above are likewise attained herewith. The connector housing can be made entirely or partially of insulating material in this case, wherein at least the blade contact is surrounded by insulating material at the location where its contact blade projects out of the material of the connector housing.

The plug-and-socket connector can have a housing in which one or more receiving cavities are formed, into which the part of the contact blade that projects out of the insulating material housing extends in each case. For example, one receiving cavity can be associated with each contact blade, or multiple contact blades can be associated with one receiving cavity. The finger touch protection is improved still further by such cavities. For example, the contact blade with the protective cover element can be arranged completely inside the space enclosed by such a receiving cavity. The respective receiving cavity in this case is designed to be open in the plugging direction, which is to say toward the plug-in face of the plug-and-socket connector, so that a mating connector can be plugged in there.

The contact blade can have a recess on the front that forms a securing element for fastening the protective cover element. The recess on the front can be arranged essentially centered on the front of the contact blade, for example. The recess on the front can, for example, form a receptacle for a connecting rib that connects opposing intermediate ribs of the protective cover element to one another. The connecting rib can be secured in the recess on the front simply by clamping in place. Alternatively or in addition, one or more barbs can be formed on the contact blade in the region of the recess on the front, by which means the protective cover element is secured.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
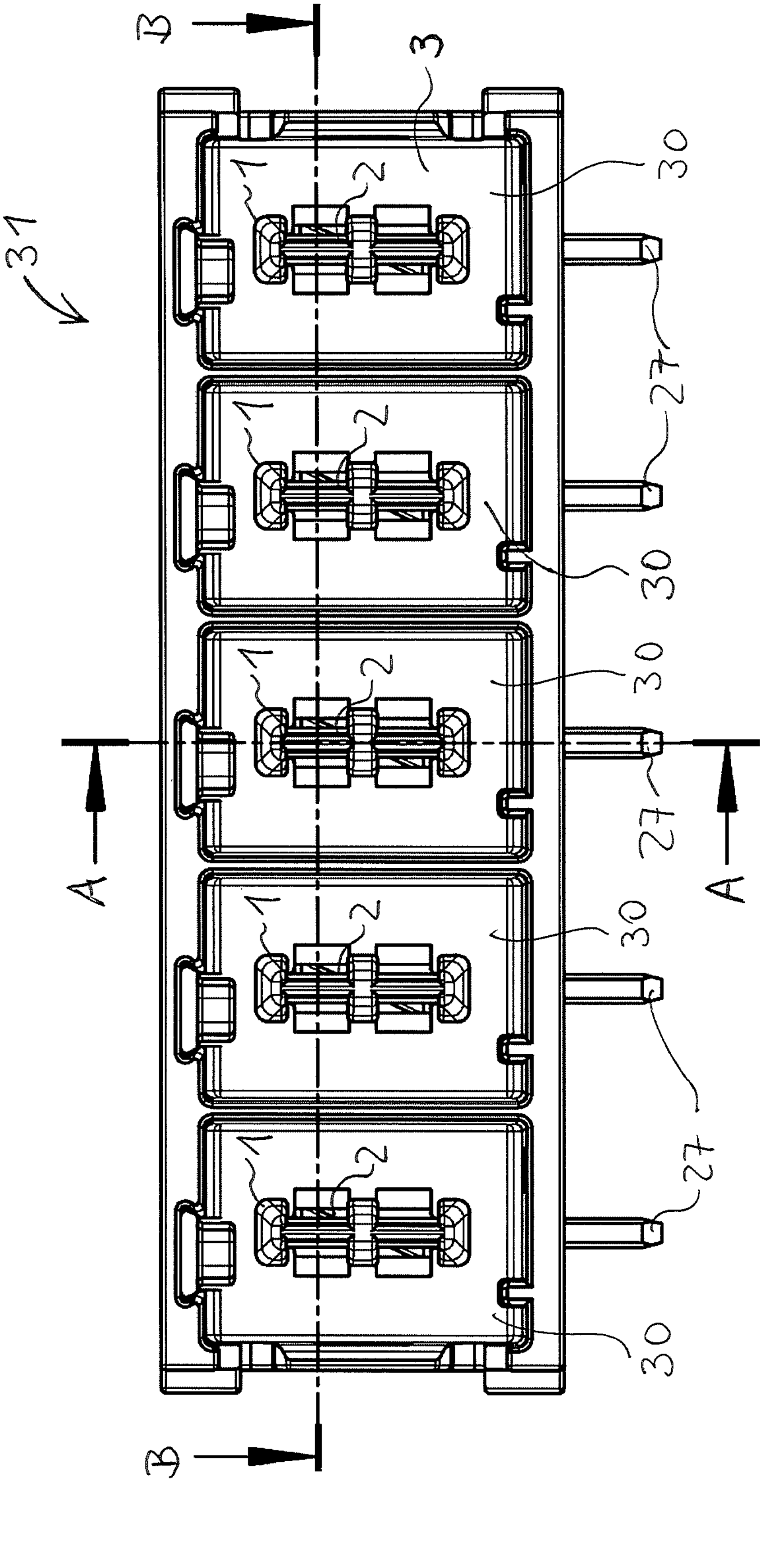
FIG. 1 is a front view of an electrical plug-and-socket connector.
Figure 2:
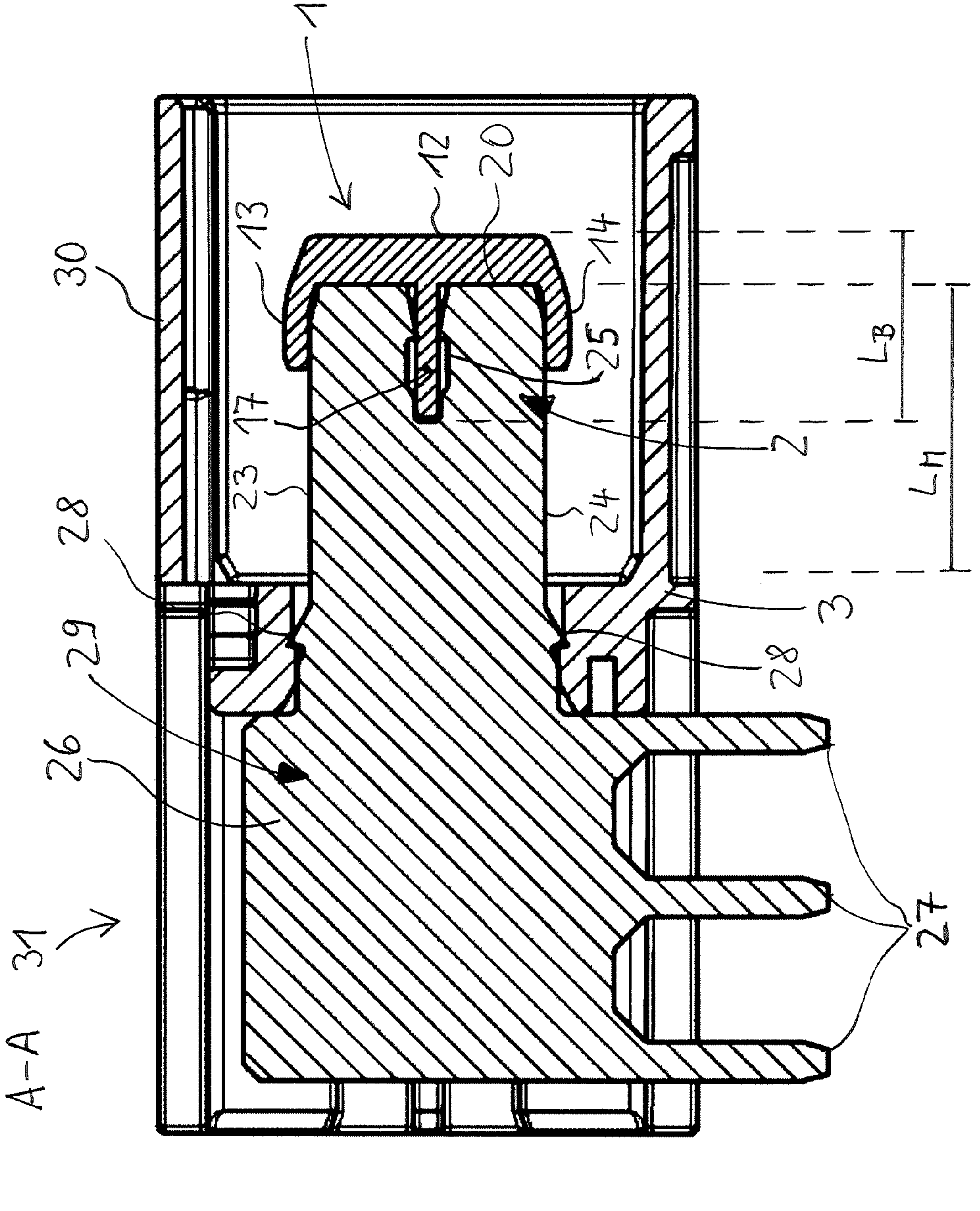
FIG. 2 is the plug-and-socket connector according to FIG. 1 in a first sectional view.
Figure 3:
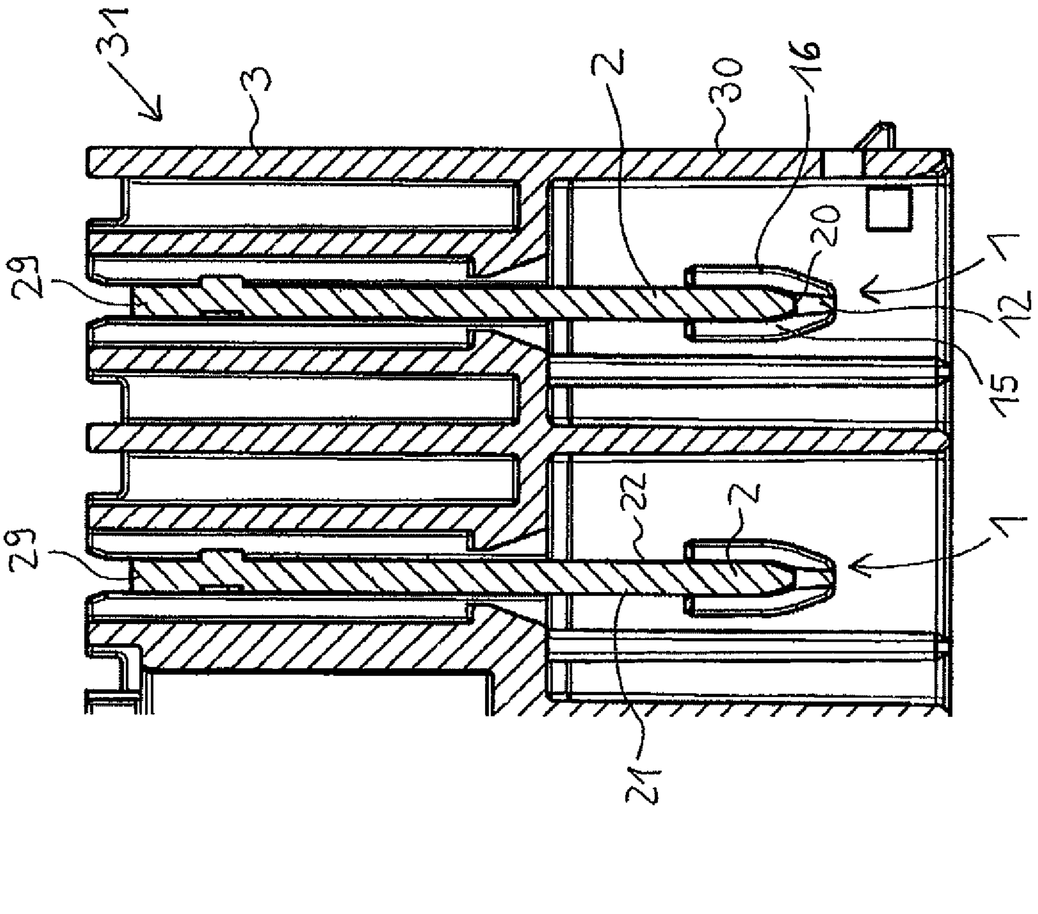
FIG. 3 is the plug-and-socket connector according to FIG. 1 in a second sectional view.

FIG. 1 shows a front view of an electrical plug-and-socket connector 31, which is to say a view of the plug-in face. FIG. 2 shows a vertical section through the electrical plug-and-socket connector 31 in the section plane A-A indicated in FIG. 1. FIG. 3 shows a horizontal section through the electrical plug-and-socket connector 31 in the section plane B-B indicated in FIG. 1.

As FIGS. 1 to 3 illustrate, the plug-and-socket connector 31 has a housing 3, on the front of which are formed receiving cavities 30. Arranged in the housing 3 are multiple blade contacts 29. Visible, for example in FIG. 2, is the entire blade contact 29 with the contact blade 2 that projects out of the housing 3 and extends into an associated receiving cavity 30. Mounted on the contact blade 2 is a protective cover element 1. In the region of each narrow-side cover 13, 14 as well as between the narrow-side covers 13, 14, the protective cover element 1 has a connecting rib 17 designed as a latch, which connects two intermediate ribs 15, 16 to one another, and which interacts with the latch 25 of the contact blade 2 when the protective cover element 1 is correctly mounted, securing the protective cover element 1 on the contact blade 2.

It can furthermore be seen that the housing 3 has a housing region that protrudes forward past the contact blade 2 and that has the receiving cavities 30. This housing region serves the function of protection against accidental contact and to mechanically receive, guide, and secure a plug-and-socket connector designed as a mating part, which can contain one or more bifurcated contacts. The blade contact 29 is secured in the housing 3 by a rear section 26. The blade contact 2 is additionally held in the housing 3 by latching projections 28. The blade contact 29 has, for example, three terminal pins 27 that protrude out of the housing 3 at an underside thereof. In this way, the plug-and-socket connector 31 can be fastened to an electrical circuit board by soldering, for example.

Figure 4:
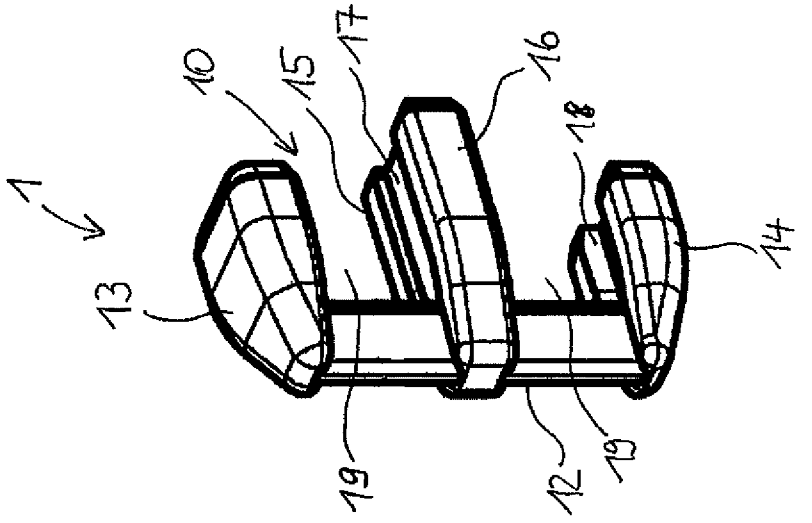
FIG. 4 is a protective cover element in a perspective view.

The protective cover element 1 already visible in FIGS. 1 to 3 is explained in detail with reference to FIG. 4. The protective cover element 1 can be made entirely of, e.g., insulating material, for example of plastic. The protective cover element 1 has an insertion side 10, through which the contact blade 2 can be inserted or with which the protective cover element 1 can be mounted on the contact blade 2. From the insertion side 10, multiple longitudinal ribs 13, 14, 15, 16 extend forward to a protective element 12 on the front. This element is designed as a front rib and connects the longitudinal ribs 13, 14, 15, 16 to one another, resulting in a robust frame structure of the protective cover element 1. In the state in which the protective cover element 1 is mounted on the blade contact 2, the protective element 12 on the front covers the front 20 of the contact blade 2.

Present as longitudinal ribs are a top narrow-side cover 13, a bottom narrow-side cover 14, as well as two intermediate ribs 15, 16 extending in the insertion direction in the center between them. The top narrow-side cover 13 and the bottom narrow-side cover 14 are U-shaped in profile, which is to say they have grooves 18, and, when the protective cover element is mounted on the contact blade 2, they surround its lateral edges 23, 24 in a U-shape. The intermediate ribs 15, 16 cover parts of the contact sides 21, 22 of the contact blade 2, wherein the intermediate rib 15 is arranged on the contact side 21 and the intermediate rib 16 on the opposite contact side 22. Formed between the individual longitudinal ribs 13, 14, 15, 16 are free spaces 19 that expose contact windows for establishment of electrical contact with the contact sides 21, 22 of the contact blade 2. The intermediate ribs 15, 16 are connected to one another by a connecting rib 17.

Figure 5:
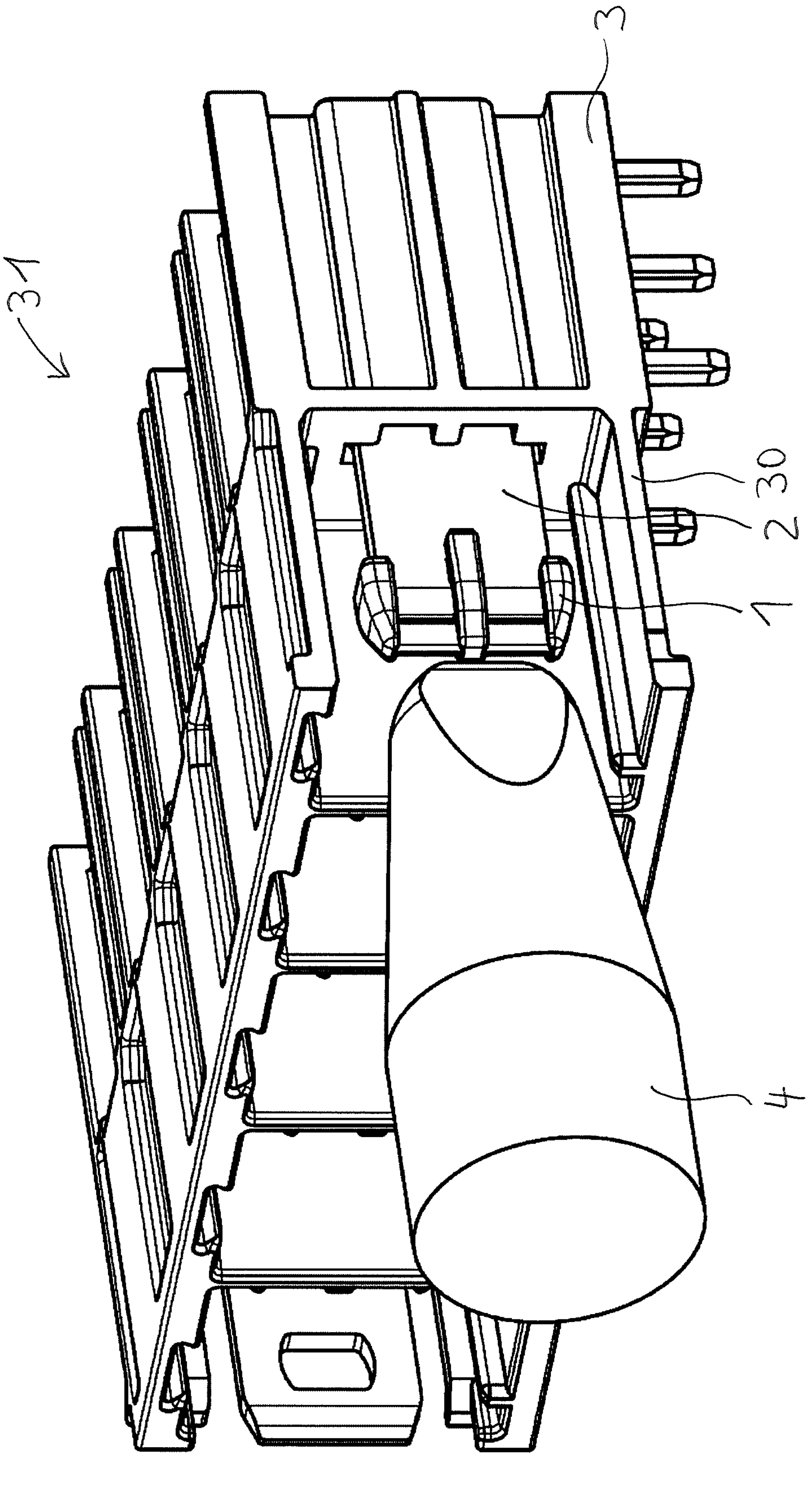
FIG. 5 is the plug-and-socket connector according to FIG. 1 in a partially sectioned, perspective view.

FIG. 5 shows testing of the finger touch protection of the plug-and-socket connector 31 with the protective cover elements 1 using a standardized test finger 4. It can be seen that the protective cover element 1 prevents direct electrical contact of the test finger 4 with a contact blade 2.

Figure 6:
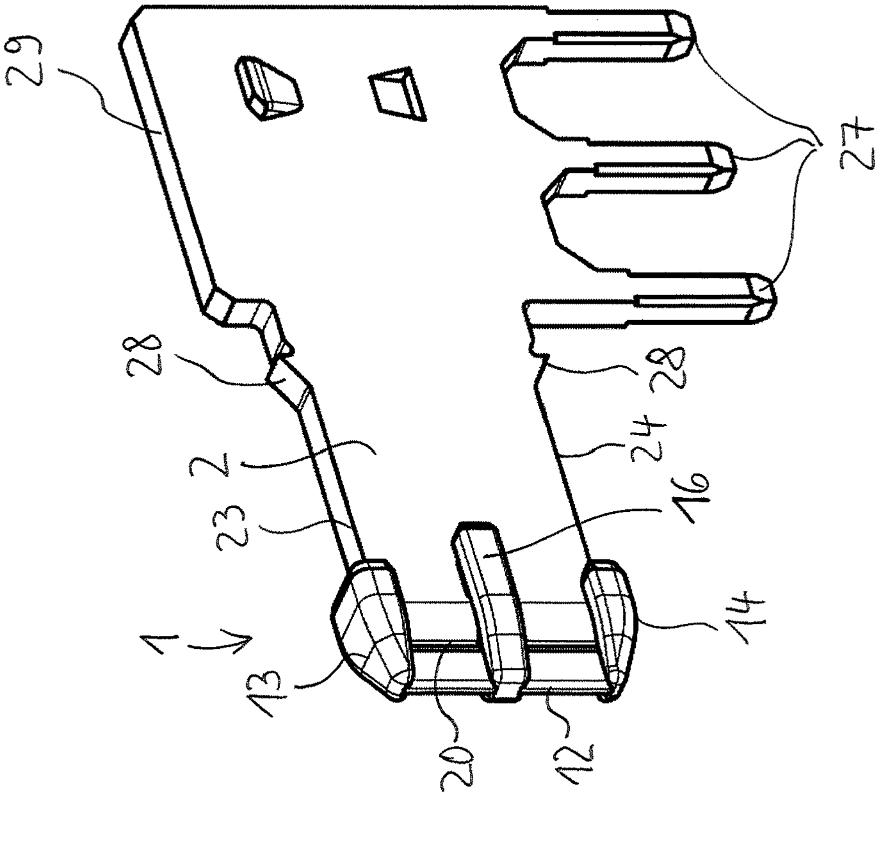
FIG. 6 is a contact blade with protective cover element in a perspective view.

FIG. 6 shows the blade contact 29 with the protective cover element 1 mounted thereon in a different view. It can be seen that the protective element 12 on the front is narrower than the contact blade 2, so that a part of the front 20 of the contact blade 2 is visible even in a front view (see FIG. 10).

Figure 7:
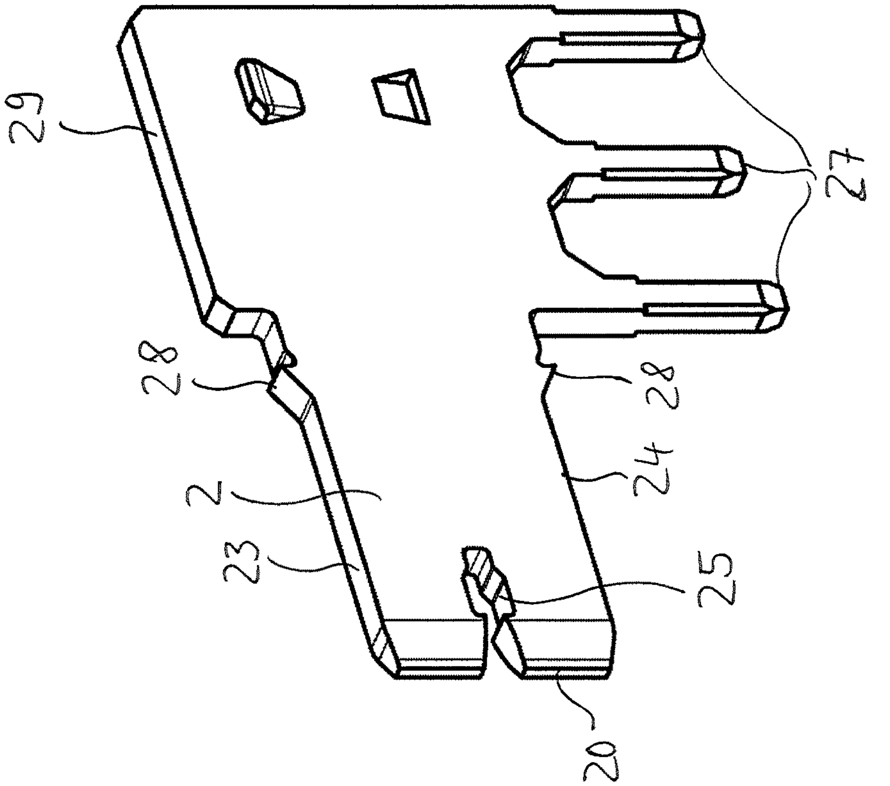
FIG. 7 is a contact blade without protective cover element in a perspective view.

FIG. 7 shows the blade contact 29 without the protective cover element. It can be seen that the contact blade 2 has a recess 25 on the front, which forms a securing element for fastening the protective cover element 1. The recess 25 on the front extends in the plugging direction from the front 20 of the contact blade 2. Barbs for clamping the connecting rib 17 in place can be formed in the recess 25.

Figure 8:
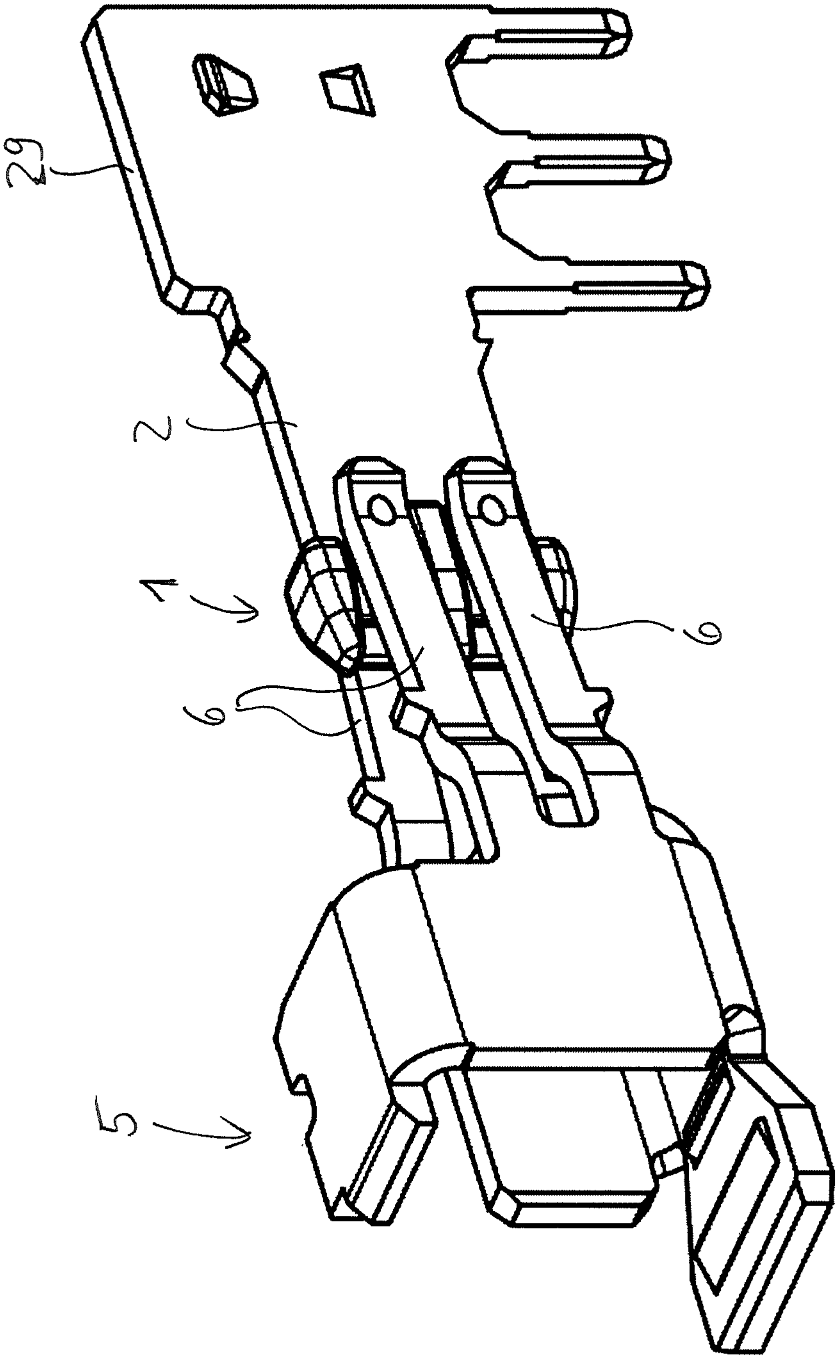
FIG. 8 is a single blade contact with protective cover element pushed on as well as a bifurcated contact designed as a mating part.

FIG. 8 shows the blade contact 29 in the embodiment that has already been described with a protective cover element 1. In addition, a bifurcated contact 5 is mounted on the contact blade 2. It can be seen that the bifurcated contact 5 has contact forks 6 formed in pairs, which come to rest on the contact blade on the left and right thereof, which is to say on the contact sides 21, 22, at the same level in each case, and establish contact. The contact forks 6 readily fit into the contact windows 19 of the protective cover element 1 formed by the longitudinal ribs, so that the bifurcated contact 5 can be connected to the contact blade 2 in the usual manner. In particular, it is not necessary to first remove the protective cover element 1 in order to mount the bifurcated contact 5.

Figure 9:
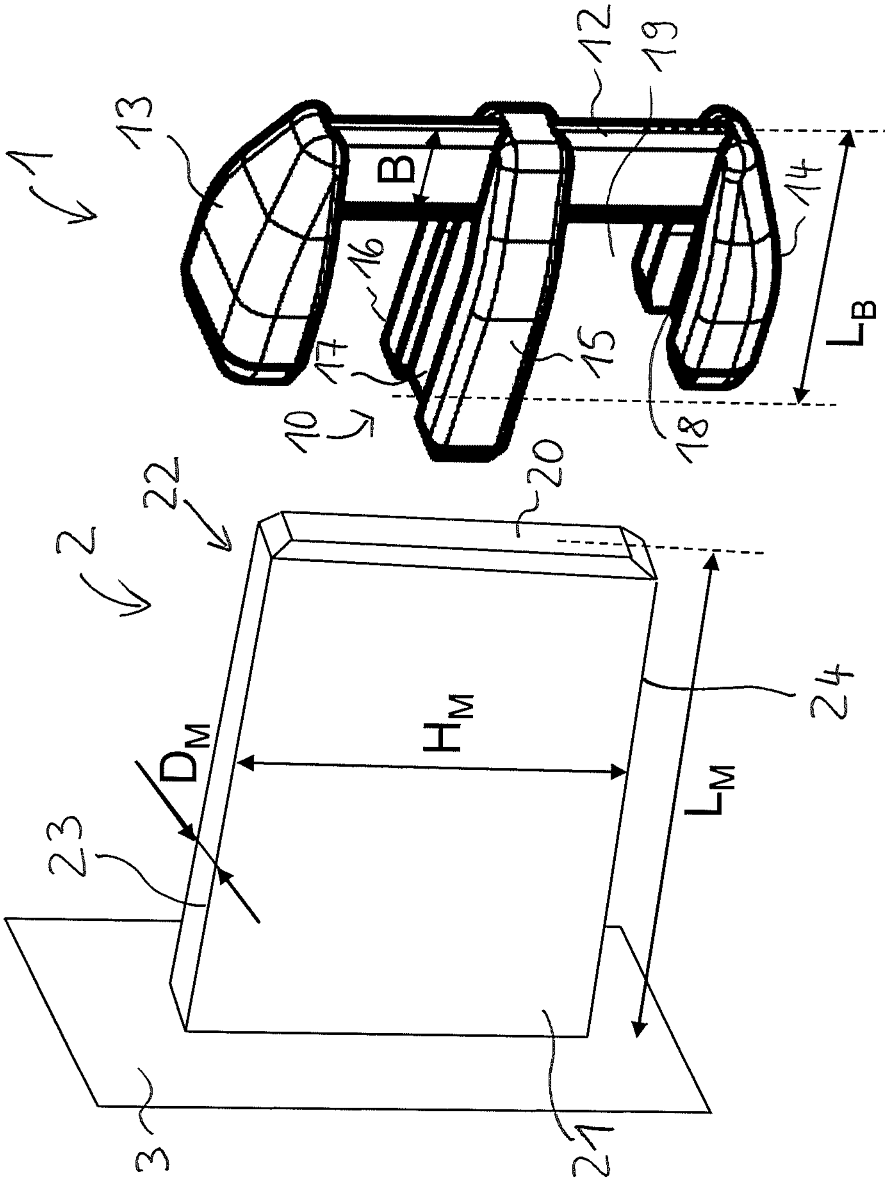
FIG. 9 is a protective cover element as well as a contact blade in a perspective view.

In the left-hand region, FIG. 9 schematically shows a single contact blade 2 of a blade contact of an electrical plug-and-socket connector, of which only a part of the housing 3 is partially shown in FIG. 1, which housing is made of insulating material in the region shown. The blade contact has a part arranged in the housing 3 of the plug-and-socket connector and a part, which constitutes the contact blade 2, projecting out of the housing 3 or projecting into the receiving cavity 30. The contact blade 2 projects out of the housing 3 through a slot in the insulating material. The contact blade 2 is essentially cuboid in design, wherein the edges and borders, in particular, can be rounded or chamfered. The contact blade 2 has two opposing contact sides 21, 22, of which only one contact side 21 is visible in FIG. 9 on account of the viewing direction. The contact sides 21, 22 are essentially parallel to one another. They are the largest sides of the contact blade 2 in terms of area. The contact sides 21, 22 are each delimited to the top and the bottom by lateral edges 23, 24 or also narrow edges. Toward the front, which is to say on the side facing away from the housing 3, the blade contact 2 terminates at a front 20. This transitions into the contact sides 21, 22 or the lateral edges 23, 24 through chamfers.

The contact blade 2 is set up such that a bifurcated contact with contact forks is mounted thereon as a mating part. The contact forks then come to rest on the respective contact sides 21, 22. The bifurcated contact is plugged onto the contact blade 2 in a plug-in direction that corresponds to the direction of the arrow labeled $L_M$, which is to say in the direction toward the housing 3 from the front 20.

The contact blade 2 has the following geometric dimensions in this case:

$L_M$: the distance between the front 20 and the insulating material of the housing 3, which is to say the length with which the contact blade 2 projects out of the insulating material.

$H_M$: width, or can also be designated height in the depiction in FIG. 9, which is to say the distance between the lateral edges 23, 24.

$D_M$: thickness, which is to say distance between the contact sides 21, 22.

The longitudinal ribs 13, 14, 15, 16 of the protective cover element 1 have a maximum length $L_B$.

Figure 10:
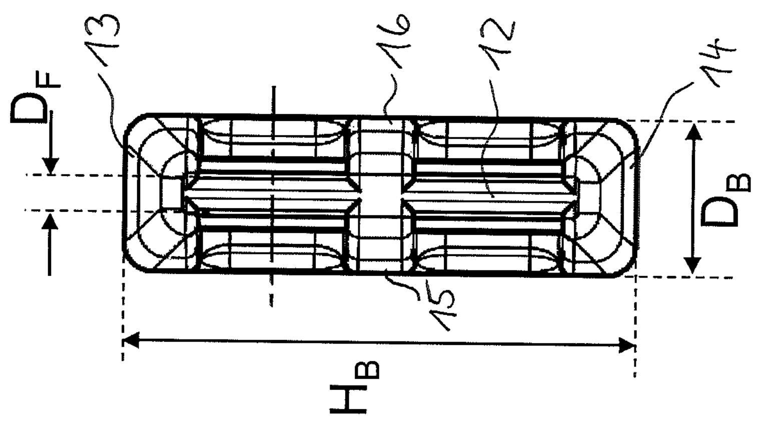
FIG. 10 is a front view of a contact blade with a protective cover element.

The following are shown in FIGS. 9 and 10 as additional geometric dimensions of the protective cover element 1:

$D_B$: width of the narrow-side covers 13, 14, which in the present case are equal in width.

B: width of the front rib 12.

$D_F$: thickness of the front rib 12.

$H_B$: height of the protective cover element 1, which is to say extent in the vertical direction, in other words in the direction of the vertical axis.

In this context, the following dimensional relationships are advantageous, for example:

$$B/L_B>0.2$$

$$L_B/L_M<0.65$$

$$(L_B-B)/L_M<0.5$$

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A protective cover element for mounting on a contact blade of a blade contact of an electrical plug-and-socket connector, a length of the contact blade projecting out of an insulating material of a connector housing of the plug-and-socket connector, the protective cover element comprising:

an insertion side with which the protective cover element is pushed over the contact blade from a front of the contact blade;

at least one insulating protective element arranged on a front of the protective cover element, the protective element at least partially covering the front of the contact blade in a plug-in direction of a bifurcated contact that is a mating part for the blade contact when the protective cover element is mounted on the contact blade; and at least two longitudinal ribs extending from the protective element in the direction toward the insertion side, wherein the at least two longitudinal ribs are shorter than 75% of the length that the contact blade projects out of the insulating material, wherein the at least two longitudinal ribs include at least one intermediate rib that extends from the front of the protective element in the direction toward the insertion side in a region between opposing lateral edges of the contact blade, and wherein the at least one intermediate rib includes a pair of intermediate ribs provided on opposing contact sides of the contact blade.

2. The protective cover element according to claim 1, wherein the longitudinal ribs have different lengths.

3. The protective cover element according to claim 1, further comprising a fastening element that fastens to a securing element of the contact blade, the fastening element being arranged on at least one of the longitudinal ribs.

4. The protective cover element according to claim 1, wherein the intermediate ribs of the pair of intermediate ribs are connected to one another by a connecting rib, the connecting rib forming another longitudinal rib that extends from the protective element in the direction towards the insertion side.

5. The protective cover element according to claim 4, wherein a fastening element for fastening the protective cover element to the contact blade is arranged on the connecting rib.

6. The protective cover element according to claim 1, wherein at least one intermediate rib of the pair of intermediate ribs constitutes a longest longitudinal rib.

7. The protective cover element according to claim 1, wherein a top narrow-side cover and/or a bottom narrow-side cover, extending from the protective element in the direction toward the insertion side, constitutes one of the longitudinal ribs and covers at least areas of a respective lateral edge of the contact blade when the protective cover element is mounted on the contact blade.

8. The protective cover element according to claim 7, wherein, on the insertion side, the protective cover element is open with no connection between the top and bottom narrow-side covers.

9. The protective cover element according to claim 1, wherein the protective element is a front rib having a length that extends across essentially an entire length of the front of the contact blade when the protective cover element is mounted on the contact blade.

10. The protective cover element according to claim 1, wherein front of the protective element has a lesser thickness than a thickness of the contact blade.

11. A protective cover element for mounting on a contact blade of a blade contact of an electrical plug-and-socket connector, the contact blade projecting out of an insulating material of a housing of the plug-and-socket connector, the protective cover element comprising:

an insertion side with which the protective cover element is pushed over the contact blade from a front of the contact blade;

at least one insulating protective element on a front of the protective cover element that at least partially covers the front of the contact blade in a plug-in direction of a bifurcated contact that is a mating part for the blade contact when the protective cover element is mounted on the contact blade; and at least two longitudinal ribs extending from the protective element in the direction toward the insertion side, wherein a top narrow-side cover and/or a bottom narrow-side cover, extending from the protective element in the direction toward the insertion side, constitutes one of the longitudinal ribs and covers at least areas of a respective lateral edge of the contact blade when the protective cover element is mounted on the contact blade, wherein, on the insertion side, the protective cover element is open with no connection between the top and bottom narrow-side covers, wherein the at least two longitudinal ribs include at least one intermediate rib that extends from the front of the protective element in the direction toward the insertion side in a region between opposing lateral edges of the contact blade, and wherein the at least one intermediate rib includes a pair of intermediate ribs provided on opposing contact sides of the contact blade.

12. An electrical plug-and-socket connector with a connector housing made of insulating material and with at least one blade contact that has, projecting out of the insulating material, a contact blade, a length of the contact blade projects out of the insulating material of the plug-and-socket connector, wherein a protective cover element according to claim 1 is mounted on the contact blade and is fastened to the contact blade by interlocking, frictional, and/or formed integrally.

13. The electrical plug-and-socket connector according to claim 12, wherein the contact blade has a recess on the front that forms a securing element for fastening the protective cover element.

* * * * *